US012783216B2

(12) United States Patent
DiFurio et al.

(10) Patent No.: US 12,783,216 B2
(45) Date of Patent: Nov. 3, 2026

(54) SYSTEM FOR PROCESS FLOW TEMPLATING AND DUPLICATION OF TASKS WITHIN MATERIAL FLOW AUTOMATION

(71) Applicant: Seegrid Corporation, Pittsburgh, PA (US)

(72) Inventors: Andrew DiFurio, Pittsburgh, PA (US); Atticus Huberts, Pittsburgh, PA (US); Tina Janulis, New York, NY (US); Jesse Legg, Pittsburgh, PA (US); Stephen Ramusivich, McMurray, PA (US); Jenna Sivak, Pittsburgh, PA (US)

(73) Assignee: SEEGRID CORPORATION, Pittsburgh, PA (US)

( * ) Notice: Subject to any disclaimer, the term of this patent is extended or adjusted under 35 U.S.C. 154(b) by 160 days.

(21) Appl. No.: 18/527,730

(22) Filed: Dec. 4, 2023

(65) Prior Publication Data

US 2024/0184540 A1 Jun. 6, 2024

Related U.S. Application Data

(60) Provisional application No. 63/430,180, filed on Dec. 5, 2022.

(51) Int. Cl.
*G06F 8/36* (2018.01)
*G06F 8/34* (2018.01)

(52) U.S. Cl.
CPC .................................... *G06F 8/34* (2013.01)

(58) Field of Classification Search
CPC .................................... G06F 8/34; G06F 8/36
See application file for complete search history.

(56) References Cited

U.S. PATENT DOCUMENTS

| | | | | |
|---|---|---|---|---|
| 9,120,224 | B2 | 9/2015 | Sanders et al. | |
| 10,929,759 | B2 | 2/2021 | Shinn et al. | |
| 11,231,939 | B2 * | 1/2022 | Murase | G06F 9/54 |
| 12,373,771 | B1 * | 7/2025 | Shivashankar | G06N 5/01 |
| 2009/0149990 | A1 * | 6/2009 | Myeong | G05D 1/0274 701/25 |
| 2011/0071672 | A1 | 3/2011 | Sanders et al. | |
| 2019/0080252 | A1 | 3/2019 | Shinn et al. | |
| 2020/0167631 | A1 * | 5/2020 | Rezgui | B25J 11/008 |
| 2022/0043455 | A1 * | 2/2022 | Ruxton | B25J 9/1694 |

FOREIGN PATENT DOCUMENTS

| | | |
|---|---|---|
| WO | 0058873 | 10/2000 |

OTHER PUBLICATIONS

International Search Report and Written Opinion dated Apr. 23, 2024 issued in International Application No. PCT/2023/082258.

* cited by examiner

*Primary Examiner* — Jae U Jeon
(74) *Attorney, Agent, or Firm* — Onello & Mello PC

(57) ABSTRACT

A system and method are provided providing repeatable, general processes for AMRs that can be transferred between systems, facilities and customers. In some embodiments, the system and/or method comprise: at least one autonomous mobile robot (AMR); a management system comprising at least one processor configured to generate model repeatable instructions for execution of movement of the at least one AMR in a first system; and a transfer system comprising at least one processor configured to export the model repeatable instructions from the first system and import the model repeatable instructions to a second system.

18 Claims, 11 Drawing Sheets

FIG. 8A
Fleet Central
C
Robots
Locations
Jobs
M
<- Select Trigger
1. What is this condition based on?
Select trigger basis
C = Configure
M = Monitor

SYSTEM FOR PROCESS FLOW TEMPLATING AND DUPLICATION OF TASKS WITHIN MATERIAL FLOW AUTOMATION

CROSS REFERENCE TO RELATED APPLICATIONS

The present application may be related to U.S. Provisional Appl. 63/430,180 filed on Dec. 5, 2022, entitled System for Process Flow Templating and Duplication of Tasks Within Material Flow Automation, the contents of which are incorporated herein by reference.

The present application may be related to International Application No. PCT/US23/016556 filed on Mar. 28, 2023, entitled A Hybrid, Context-Aware Localization System For Ground Vehicles; International Application No. PCT/US23/016565 filed on Mar. 28, 2023, entitled Safety Field Switching Based On End Effector Conditions In Vehicles; International Application No. PCT/US23/016608 filed on Mar. 28, 2023, entitled Dense Data Registration From An Actuatable Vehicle-Mounted Sensor; International Application No. PCT/U.S. Pat. No. 23,016,589, filed on Mar. 28, 2023, entitled Extrinsic Calibration Of A Vehicle-Mounted Sensor Using Natural Vehicle Features; International Application No. PCT/US23/016615, filed on Mar. 28, 2023, entitled Continuous And Discrete Estimation Of Payload Engagement Disengagement Sensing; International Application No. PCT/US23/016617, filed on Mar. 28, 2023, entitled Passively Actuated Sensor System; International Application No. PCT/US23/016643, filed on Mar. 28, 2023, entitled Automated Identification Of Potential Obstructions In A Targeted Drop Zone; International Application No. PCT/US23/016641, filed on Mar. 28, 2023, entitled Localization of Horizontal Infrastructure Using Point Clouds; International Application No. PCT/US23/016591, filed on Mar. 28, 2023, entitled Robotic Vehicle Navigation With Dynamic Path Adjusting; International Application No. PCT/US23/016612, filed on Mar. 28, 2023, entitled Segmentation of Detected Objects Into Obstructions and Allowed Objects; International Application No. PCT/US23/016554, filed on Mar. 28, 2023, entitled Validating the Pose of a Robotic Vehicle That Allows It To Interact With An Object On Fixed Infrastructure; and International Application No. PCT/US23/016551, filed on Mar. 28, 2023, entitled A System for AMRs That Leverages Priors When Localizing and Manipulating Industrial Infrastructure; International Application No.: PCT/US23/024114, filed on Jun. 1, 2023, entitled System and Method for Generating Complex Runtime Path Networks from Incomplete Demonstration of Trained Activities; International Application No.: PCT/US23/023699, filed on May 26, 2023, entitled System and Method for Performing Interactions with Physical Objects Based on Fusion of Multiple Sensors; International Application No.: PCT/US23/024411, filed on Jun. 5, 2023, entitled Lane Grid Setup for Autonomous Mobile Robots (AMRs); International Application No.: PCT/US23/033818, filed on Sep. 27, 2023, entitled Shared Resource Management System and Method; International Application No.: PCT/US23/079141, filed on Nov. 8, 2023, entitled System And Method For Definition Of A Zone Of Dynamic Behavior With A Continuum Of Possible Actins and Locations Within Same; International Application No.: PCT/US23/078890, filed on Nov. 7, 2023, entitled Method And System For Calibrating A Light-Curtain; International Application No.: PCT/US23/036650, filed on Nov. 2, 2023, entitled System and Method for Optimized Traffic Flow Through Intersections with Conditional Convoying Based on Path Network Analysis; US Provisional Appl. 63/430,184 filed on Dec. 5, 2022, entitled Just in Time Destination Definition and Route Planning; US Provisional Appl. 63/430,182 filed on Dec. 5, 2022, entitled Composable Patterns of Material Flow Logic for the Automation of Movement; U.S. Provisional Appl. 63/430,174 filed on Dec. 5, 2022, entitled Process Centric User Configurable Step Framework for Composing Material Flow Automation; U.S. Provisional Appl. 63/430,195 filed on Dec. 5, 2022, entitled Generation of "Plain Language" Descriptions Summary of Automation Logic; US Provisional Appl. 63/430,171 filed on Dec. 5, 2022, entitled Hybrid Autonomous System Enabling and Tracking Human Integration into Automated Material Flow; US Provisional Appl. 63/430,190 filed on Dec. 5, 2022, entitled Configuring a System That Handles Uncertainty with Human and Logic Collaboration in A Material Flow Automation Solution; U.S. Provisional Appl. 63/430,200 filed on Dec. 5, 2022, entitled A Method for Abstracting Integrations Between Industrial Controls and Autonomous Mobile Robots (AMRs); and US Provisional Appl. 63/430,170 filed on Dec. 5, 2022, entitled Visualization of Physical Space Robot Queuing Areas as Non Work Locations for Robotic Operations, each of which is incorporated herein by reference in its entirety.

The present application may be related to U.S. patent application Ser. No. 11/350,195, filed on Feb. 8, 2006, U.S. Pat. No. 7,466,766, Issued on Nov. 4, 2008, entitled Multidimensional Evidence Grids and System and Methods for Applying Same; U.S. patent application Ser. No. 12/263,983 filed on Nov. 3, 2008, U.S. Pat. No. 8,427,472, Issued on Apr. 23, 2013, entitled Multidimensional Evidence Grids and System and Methods for Applying Same; U.S. patent application Ser. No. 11/760,859, filed on Jun. 11, 2007, U.S. Pat. No. 7,880,637, Issued on Feb. 1, 2011, entitled Low-Profile Signal Device and Method For Providing Color-Coded Signals; U.S. patent application Ser. No. 12/361,300 filed on Jan. 28, 2009, U.S. Pat. No. 8,892,256, Issued on Nov. 18, 2014, entitled Methods For Real-Time and Near-Real Time Interactions With Robots That Service A Facility; U.S. patent application Ser. No. 12/361,441, filed on Jan. 28, 2009, U.S. Pat. No. 8,838,268, Issued on Sep. 16, 2014, entitled Service Robot And Method Of Operating Same; U.S. patent application Ser. No. 14/487,860, filed on Sep. 16, 2014, U.S. Pat. No. 9,603,499, Issued on Mar. 28, 2017, entitled Service Robot And Method Of Operating Same; U.S. patent application Ser. No. 12/361,379, filed on Jan. 28, 2009, U.S. Pat. No. 8,433,442, Issued on Apr. 30, 2013, entitled Methods For Repurposing Temporal-Spatial Information Collected By Service Robots; U.S. patent application Ser. No. 12/371,281, filed on Feb. 13, 2009, U.S. Pat. No. 8,755,936, Issued on Jun. 17, 2014, entitled Distributed Multi-Robot System; U.S. patent application Ser. No. 12/542,279, filed on Aug. 17, 2009, U.S. Pat. No. 8,169,596, Issued on May 1, 2012, entitled System And Method Using A Multi-Plane Curtain; U.S. patent application Ser. No. 13/460,096, filed on Apr. 30, 2012, U.S. Pat. No. 9,310,608, Issued on Apr. 12, 2016, entitled System And Method Using A Multi-Plane Curtain; U.S. patent application Ser. No. 15/096,748, filed on Apr. 12, 2016, U.S. Pat. No. 9,910,137, Issued on Mar. 6, 2018, entitled System and Method Using A Multi-Plane Curtain; U.S. patent application Ser. No. 13/530,876, filed on Jun. 22, 2012, U.S. Pat. No. 8,892,241, Issued on Nov. 18, 2014, entitled Robot-Enabled Case Picking; U.S. patent application Ser. No. 14/543,241, filed on Nov. 17, 2014, U.S. Pat. No. 9,592,961, Issued on Mar. 14, 2017, entitled Robot-Enabled Case Picking; U.S. patent application Ser. No. 13/168,639, filed on Jun. 24, 2011, U.S.

Pat. No. 8,864,164, Issued on Oct. 21, 2014, entitled Tugger Attachment; US Design Patent Appl. 29/398,127, filed on Jul. 26, 2011, U.S. Pat. No. D680,142, Issued on Apr. 16, 2013, entitled Multi-Camera Head; US Design Patent Appl. 29/471,328, filed on Oct. 30, 2013, U.S. Pat. No. D730,847, Issued on Jun. 2, 2015, entitled Vehicle Interface Module; U.S. patent application Ser. No. 14/196,147, filed on Mar. 4, 2014, U.S. Pat. No. 9,965,856, Issued on May 8, 2018, entitled Ranging Cameras Using A Common Substrate; U.S. patent application Ser. No. 16/103,389, filed on Aug. 14, 2018, U.S. Pat. No. 11,292,498, Issued on Apr. 5, 2022, entitled Laterally Operating Payload Handling Device; U.S. patent application Ser. No. 17/712,660, filed on Apr. 4, 2022, US Publication Number 2022/0297734, Published on Sep. 22, 2022, entitled Laterally Operating Payload Handling Device; U.S. patent application Ser. No. 16/892,549, filed on Jun. 4, 2020, U.S. Pat. No. 11,693,403, Issued on Jul. 4, 2023, entitled Dynamic Allocation And Coordination of Auto-Navigating Vehicles and Selectors; U.S. patent application Ser. No. 18/199,052, filed on May 18, 2023, Publication Number 2023/0376030, Published on Nov. 23, 2023, entitled Dynamic Allocation And Coordination of Auto-Navigating Vehicles and Selectors; U.S. patent application Ser. No. 17/163,973, filed on Feb. 1, 2021, US Publication Number 2021/0237596, Published on Aug. 5, 2021, entitled Vehicle Auto-Charging System and Method; U.S. patent application Ser. No. 17/197,516, filed on Mar. 10, 2021, US Publication Number 2021/0284198, Published on Sep. 16, 2021, entitled Self-Driving Vehicle Path Adaptation System and Method; U.S. patent application Ser. No. 17/490,345, filed on Sep. 30, 2021, US Publication Number 2022/0100195, Published on Mar. 31, 2022, entitled Vehicle Object-Engagement Scanning System And Method; U.S. patent application Ser. No. 17/478,338, filed on Sep. 17, 2021, US Publication Number 2022/0088980, Published on Mar. 24, 2022, entitled Mechanically-Adaptable Hitch Guide; U.S. patent application Ser. No. 29/832,212, filed on Mar. 25, 2022, entitled Mobile Robot, each of which is incorporated herein by reference in its entirety.

FIELD OF INTEREST

The present inventive concepts relate to the field of robotics and autonomous mobile robots (AMRs). In particular, the inventive concepts may be related to systems and methods in the field of providing repeatable, general processes for autonomous mobile robots (AMRs) that can be transferred between systems, facilities, and customers.

BACKGROUND

Within increasing numbers and types of environments autonomous vehicles may travel through areas and/or along pathways that are shared with other vehicles and/or pedestrians. Such other vehicles can include other autonomous vehicles, semi-autonomous vehicles, and/or manually operated vehicles. The autonomous vehicles can take a variety of forms and can be referred to using various terms, such as mobile robots, robotic vehicles, automated guided vehicles, and/or autonomous mobile robots (AMRs). In some cases, these vehicles can be configured for operation in an autonomous mode where they self-navigate or in a manual mode where a human directs the vehicle's navigation. Herein, vehicles that are configured for autonomous navigation are referred to as AMRs.

Multiple AMRs may have access to an environment. The environment can be within, for example, a warehouse or large storage space or facility and the AMRs can include, but are not limited to, pallet lifts, pallet trucks, and tuggers. AMRs require user defined instruction to move material in a facility. The instructions ultimately direct the AMR where and when to move material.

Industrial automation succeeds because customers have a lot of repeatable processes. Repeatable processes lead to automation, which leads to generalization across sites, customers, and industries. In order to generalize across sites, customers, and industries, there needs to be a way to scale basic building blocks of what it means to accomplish meaningful work. To facilitate this, there needs to be a way to extract common, high-level components such that they can be exported from one system and imported into another.

It is critical to create repeatable processes to effectively manage material flow. Without leveraging pattern modeling, the application logic is unable to scale and support complex applications.

Currently, in the case of AMRs, each customer's robotic application must be manually designed and implemented from scratch every time. Given that there is not a way to export applications, the time and effort taken to install one facility's fleet of AMRs cannot be transferred to another, even if the other is exactly the same.

SUMMARY

In accordance with one aspect of the inventive concepts, provided is a job builder system, comprising: at least one processor coupled to at least one computer storage device and a template building computer program code executable by the at least one processor and configured to generate a set of user interactive computer screens on a display that enable a user to generate and store a reusable job template. The template building computer program code is executable for rendering mechanisms that enable the user to: define a trigger, define one or more behaviors executable by an autonomous system in response to the trigger; for each behavior, define a location field with an unspecified location; and store the job template as a downloadable and customizable job template for use by one or more autonomous systems.

In various embodiments, the system further comprises at least one database of behaviors that are user selectable.

In various embodiments, the one or more autonomous systems comprises a plurality of autonomous mobile robots (AMRs).

In various embodiments, the system is configured to export the job template to a job template storage system configured to store a plurality of job templates.

In various embodiments, the job builder system is further configured to import job templates from a job template storage system configured to store a plurality of job templates.

In various embodiments, the job template storage system is remote to the job builder system.

In various embodiments, the job template storage system is local to the job builder system.

In various embodiments, the system further comprises a job template storage system configured to store the job template.

In various embodiments, the job template storage system is accessible by plurality of remote systems for export and/or import of job templates.

In various embodiments, the job template storage system is configured to enable a first system to upload a job template for use by a first set of autonomous systems in a first environment and a second system to download the job template for use by a second set of autonomous system in a second environment.

In various embodiments, the job template storage system is configured to store the job template in a job template library configured to store a plurality of job templates.

In various embodiments, the job template storage system is configured to organize or logically relate job templates in the job template library based on tasks type, customer, or facility.

In various embodiments, the system further comprises job generation program code configured to generate a user interactive display that enables a user to select the job template and to define locations for each location field to generate a job for execution by the autonomous system.

In various embodiments, the job generation program code is further configured to assign the job to one or more autonomous systems.

In various embodiments, the one or more autonomous system comprises one or more autonomous mobile robots (AMRs).

In various embodiments, the template building program code is further executable to extract a job template from a job defined for performance of a task.

In various embodiments, the template building program code is further executable to extract a sequence of triggers and associated behaviors with unspecified locations to extract the job template.

In various embodiments, the template building program code is further configured to store the extracted job template as a new downloadable and customizable job template for use by one or more autonomous systems.

In accordance with another aspect of the inventive concepts, provided is a job builder method, comprising: providing at least one processor coupled to at least one computer storage device; and generating a set of user interactive computer screens on a display that enable a user to generate and store a reusable job template. Generating the user interactive computer screens enables: defining a trigger, defining one or more behaviors executable by an autonomous system in response to the trigger; for each behavior, defining a location field with an unspecified location; and storing the job template as a downloadable and customizable job template for use by one or more autonomous systems.

In various embodiments, the method further comprises storing the job template is at least one database of behaviors that are user selectable.

In various embodiments, the one or more autonomous systems comprises a plurality of autonomous mobile robots (AMRs).

In various embodiments, the method further comprises exporting the job template to a In various embodiments, the method further comprises importing job templates from a job template storage system configured to store a plurality of job templates.

In various embodiments, the job template storage system is remote to the job builder system.

In various embodiments, the job template storage system is local to the job builder system.

In various embodiments, the method further comprises storing the job template in a job template storage system.

In various embodiments, the job template storage system is accessible by plurality of remote systems for export and/or import of job templates.

In various embodiments, the method further comprises a first system uploading a job template for use by a first set of autonomous systems in a first environment to the job template storage system and a second system downloading the job template for use by a second set of autonomous system in a second environment.

In various embodiments, the method further comprises the job template storage system storing the job template in a job template library configured to store a plurality of job templates.

In various embodiments, the method further comprises the job template storage system organizing or logically relating job templates in the job template library based on tasks type, customer, or facility.

In various embodiments, the method further comprises job generation program code generating a user interactive display enabling a user to select the job template and to define locations for each location field to generate a job for execution by the autonomous system.

In various embodiments, the method further comprises the job generation program code assigning the job to one or more autonomous systems.

In various embodiments, the one or more autonomous system comprises one or more autonomous mobile robots (AMRs).

In various embodiments, the method further comprises extracting a job template from a job defined for performance of a task.

In various embodiments, extracting the job template includes extracting a sequence of triggers and associated behaviors with unspecified locations to.

In various embodiments, the method further comprises storing the extracted job template as a new downloadable and customizable job template for use by one or more autonomous systems.

In accordance with various aspects of the inventive concepts, provided is a a job template comprising a model of instructions for task performance when executed by at least one autonomous mobile robot (AMR) in a first system and a transfer system comprising at least one processor configured to export the job template from the first system and import the job template to a second system.

In various embodiments, the system further comprises at least one processor at the second system configured to provide site-specific details to the job template to create a job.

In various embodiments, further comprises a management system at the second system configured to store the job template.

In various embodiments, the system further comprises a storage system configured to store the job template.

In various embodiments, the system further comprises a user interface in the first system and/or the second system configured to allow a user to select the job template and generate a job by adding details to the job template.

In accordance with various aspects of the inventive concepts, provided is a method, comprising: providing at least one autonomous mobile robot (AMR); generating model repeatable instructions for execution of movement of the at least one AMR in a first system; exporting the model repeatable instructions from the first system; and importing the model repeatable instructions to a second system.

In various embodiments, the method further comprises storing the job template in a storage system.

In various embodiments, selecting the job template using a user interface in the first system and/or the second system and generating a job by adding details to the selected job template and saving the job.

In accordance with various aspects of the inventive concepts, provided is a system, comprising: at least one processor coupled to at least one memory and a computer program code executable by the at least one processor to: generate a set of template builder displays soliciting user inputs defining a model of instructions for task performance; and store the model of instructions as a job template useable by any of a plurality of autonomous mobile robots (AMRs); and generate a set of job builder displays soliciting user inputs to create a job based on the job template, the job builder displays configured to enable a user to select the job template, add site-specific details to the selected job template, and save the job.

In various embodiments, the job template comprises at least one trigger having an associated one or more behaviors to the performed by an AMR at a location in response to occurrence of the at least one trigger.

In various embodiments, the job comprises the at least one trigger having the associated one or more behaviors to the performed by an AMR at locations indicated by the site-specific details in response to occurrence of the at least one trigger.

In various embodiments, the system is further configured to receive a message indicating occurrence of the trigger and in response assign the job to an AMR from the plurality of AMRs for execution.

In various embodiments, the system is configured to wirelessly communicate the job to the AMR.

In various embodiments, the system is further configured to monitor a plurality of AMRs and select the AMR from the plurality of AMR based on availability and/or location of the AMR.

In various embodiments, the system further comprises a transfer system comprising at least one processor configured to export the job template from a first system comprising the plurality of AMRs to a second system for use by AMRs associated with the second system.

In various embodiments, the system further comprises a storage system comprising a library configured to job templates.

In various embodiments, the library is configured to import job templates from external or remote systems and/or export job templates to external or remote systems.

In various embodiments, the library is configured to organize stored job templates based on job type, AMR type, customer, and/or facility.

In accordance with various aspects of the inventive concepts, provided is a method, comprising: providing at least one processor coupled to at least one memory; generating a set of template builder displays soliciting user inputs defining a model of instructions for task performance; storing the model of instructions as a job template useable by any of a plurality of autonomous mobile robot (AMRs); generating a set of job builder displays soliciting user inputs to create a job based on the job template, the job builder displays configured to enable a user to select the job template, add site-specific details to the selected job template, and saving the job.

In various embodiments, the job template comprises at least one trigger having an associated one or more behaviors to the performed by an AMR at a location in response to occurrence of the at least one trigger.

In various embodiments, the at least one trigger having the associated one or more behaviors to the performed by an AMR at locations indicated by the site-specific details in response to occurrence of the at least one trigger.

In various embodiments, the method further comprises receiving a message indicating occurrence of the trigger and in response assigning the job to an AMR from the plurality of AMRs for execution.

In various embodiments, the method further comprises wirelessly communicating the job to the AMR.

In various embodiments, the method further comprises monitoring a plurality of AMRs and selecting the AMR from the plurality of AMR based on availability and/or location of the AMR.

In various embodiments, the method further comprises exporting the job template from a first system comprising the plurality of AMRs to a transfer system and from the transfer system to a second system for use by AMRs associated with the second system.

In various embodiments, the method further comprises storing the job template in a storage system comprising a library of job templates.

In various embodiments, the library is configured to import job templates from external or remote systems and/or export job templates to external or remote systems.

In various embodiments, the method further comprises organizing stored job templates in the library based on job type, AMR type, customer, and/or facility.

BRIEF DESCRIPTION OF THE DRAWINGS

The present inventive concepts will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings.

DETAILED DESCRIPTION OF PREFERRED EMBODIMENTS

Figure 1:
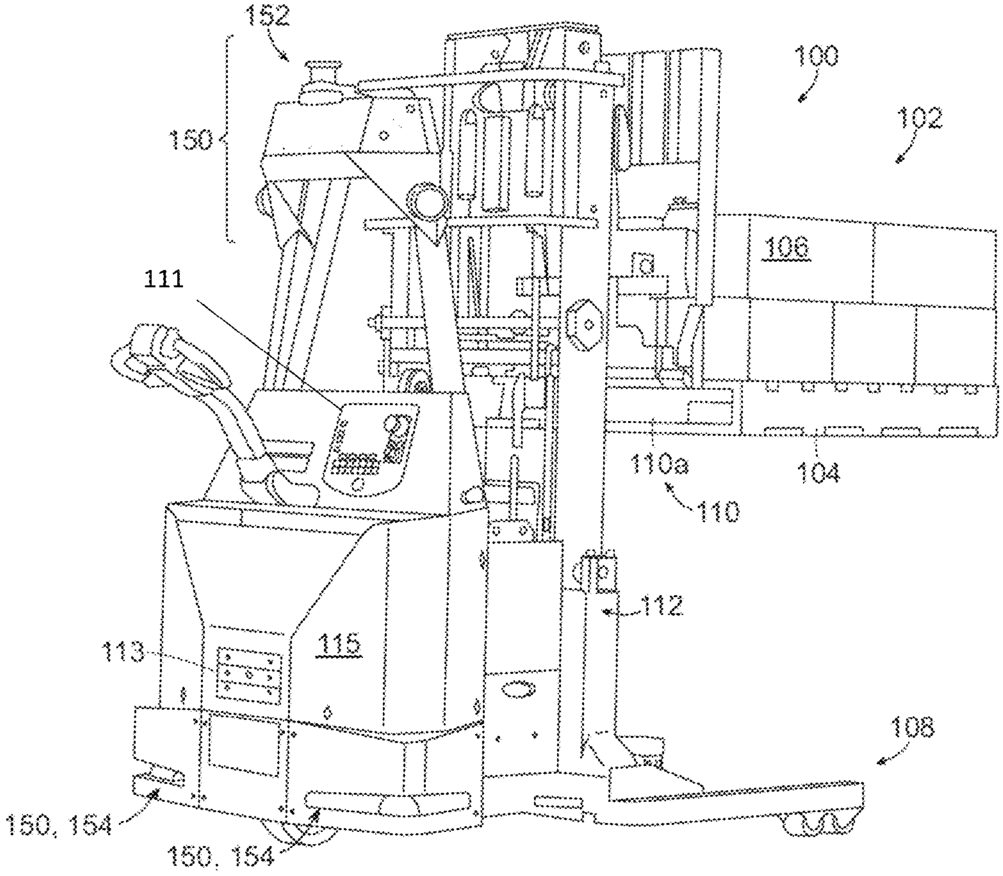
FIG. 1 is a perspective view of an embodiment of an AMR forklift that comprises an embodiment of the systems described herein, in accordance with aspects of the inventive concepts.

Various aspects of the inventive concepts will be described more fully hereinafter with reference to the accompanying drawings, in which some exemplary embodiments are shown. The present inventive concept may, however, be embodied in many different forms and should not be construed as limited to the exemplary embodiments set forth herein.

It will be understood that, although the terms first, second, etc. are be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

To the extent that functional features, operations, and/or steps are described herein, or otherwise understood to be included within various embodiments of the inventive concept, such functional features, operations, and/or steps can be embodied in functional blocks, units, modules, operations and/or methods. And to the extent that such functional blocks, units, modules, operations and/or methods include computer program code, such computer program code can be stored in a computer readable medium, e.g., such as non-transitory memory and media, that is executable by at least one computer processor.

In accordance with an aspect of the inventive concepts, a system and method are provided for providing repeatable, general processes for robotic vehicles, such as autonomous mobile robots (AMRs), that can be transferred between systems, facilities, and customers. The system and method provide a modular job framework that can be duplicated and modified using job templates enabling pattern modeling of tasks, such as material flow tasks, across disconnected physical sites or among different AMRs at the same site.

In accordance with aspects of the inventive concepts, provided is a system and a method that implement a process flow configuration tool that enables the generation of job templates that can be reused and customized for different jobs and/or different settings. In some embodiments, the job templates apply to material handling and flow tasks, such as picks and drop of loads in a warehouse or other goods storage setting. A pick occurs when the AMR acquires a load for transport and a drop occurs with the AMR delivers the load, both of which happen at predetermined locations along a route auto-navigated by the AMR. The inventive concepts improve efficiency, saving time and labor in the creation of jobs to be executed by robotic vehicles, where the jobs are created using reusable and customizable job templates.

The framework refers to the components that make up a job, such as its behaviors, triggers, robot groups, etc. The job template refers to an entity that contains a specific configuration of behaviors, triggers, robot groups etc. For instance, one such job template might be titled "Simple job" and contain a single pick step and a single drop step, each at a different location, triggered by an operator, with no robot group (see, for example, FIG. 3). Each template maps back to a specific type of job that might occur in a facility and can be further customized using a job builder user interface (UI) to meet that facility's specific requirements. The framework refers to the building blocks provided to create a job, a template provides a structure for an orientation of those building blocks that can be common and reused across many customer sites, for example. In various embodiments, a job template, of which many templates can exist for various use cases and represent a starting point, must be further customized to contain specific information for a specific AMR job in a facility.

In various embodiments, the templates may include common core components, for example, triggers, robot groups, behaviors, such as a specific sequence of steps, a location or location group for performance of the behaviors. The sequence of steps can embody behaviors to be performed at one or more locations. If a step requires a location group, the source of the location input may be specified. (See, for example, US Provisional Appl. 63/430,190 filed on Dec. 5, 2022, entitled Configuring a System that Handles Uncertainty with Human and Logic Collaboration in a Material Flow Automation Solution, for more information on location group steps, the contents of which are incorporated herein by reference.)

In various embodiments, the system and method utilize the inventive concepts of U.S. Provisional Appl. 63/430,174 filed on Dec. 5, 2022, entitled Process Centric User Configurable Step Framework for Composing Material Flow Automation, which is incorporated herein by reference, as a fundamental building block that is used to model repeatable tasks for the robots to perform. Given that there is a way to construct meaningful material movements, the system and method abstracts the common core components while ignoring the specific implementation details. The system and method take the number of steps, that is, instructions for execution of material movement, and the types of behaviors performed at the steps, but not the specific behavior to be performed, and allows a user to export the job, e.g., as a usable template. The specific behaviors can be defined as part of customization with the template is used to define a job.

For example, in the basic job template called "Simple job", named because the structure follows a straightforward pattern of a pickup point and a drop off point, this job template can contain:

A trigger of "Operator Display" (as opposed to programmable logic controllers (PLC) or warehouse management system (WMS));

A pickup step and a drop off step, but the specific locations are not defined in the template;

No robot groups selected so that any available robot may pick up this job.

In a material flow application, when using this job template as a starting point for creating a job that can later be requested, a user must fill in the specific pick and drop locations or select a location group for each step. The templates provide starting points for common job patterns that are reusable and customizable. In some embodiments, a graphical user interface (GUI) may be used for creating new job templates, selecting existing job templates, and/or customizing job templates.

In some embodiments, a job template can be extracted from a defined job, as a manner of generating a job template. To extract a job template, a job template processor strips out or otherwise leaves out specifics of the job, maintaining behaviors and triggers in a defined sequence, but omitting definitions of specific locations and AMR to perform the job.

In some embodiments, a job template can be maintained within a system that services a plurality of AMRs within an environment and reused for different jobs and/or by different AMRs within the same environment. Regardless of how it was generated, a job templated can be electronically exported from one system and electronically imported to another for use by other AMRs in a different environment, e.g., at another facility or for another customer. Systems that import a job template, therefore, must be configured to electronically access the template, as well as customize and store the template in a format usable by its resources, e.g., robotic vehicles. Once imported, the template serves as an outline of a job for robot vehicles to perform and can subsequently be "filled in" and/or modified with the environment-specific details (for example, behaviors, locations, AMR assignment) needed to generate a job from the job template that is applicable to the importing environment.

Therefore, the system and method in accordance with the inventive concepts, abstract the common components, making the process easier to scale, more efficient, and much less error prone.

The system and method allow job templates to be quickly cloned and disseminated, or exported, to other relevant sites eliminating the need for each new install to be built and configured from scratch. In some embodiments, job templates can be stored in a library of job templates that are individually downloadable and/or accessible. In some embodiments, job templates can be stored in a library of job templates, where some job templates can be grouped or logically related to create a set of job templates that is downloadable, or importable. A set of job templates can be related to specific tasks and/or a set of related or complimentary tasks.

The system and method can be used by a customer to quickly and efficiently expand workflow patterns across facilities by utilizing the same job template or templates across those facilities. Once one facility is setup and configured correctly, the workflows (expressed in job templates) can easily be exported from the initial site and imported to various other sites. This allows for rapid, more efficient, and less error-prone expansion, uniformity, and efficiency. The system and method can be used to either export single workflow patterns or bulk workflow patterns expressed in one or more job templates.

FIG. 1 is a perspective view of an embodiment of a robotic vehicle in the form of an AMR forklift 100 that comprises features described herein, in accordance with aspects of the inventive concepts.

In this embodiment, AMR 100 includes a payload area 102 configured to transport a pallet 104 loaded with goods 106, as a palletized load. To engage and carry pallet 104, the AMR may include a pair of forks 110, including a first and second fork 110*a, b* (not shown). Outriggers 108 extend from the robotic vehicle in the direction of the forks to stabilize the vehicle, particularly when carrying palletized load 106. AMR 100 can comprise a battery area 112 for holding one or more batteries. In various embodiments, the one or more batteries can be configured for charging via a charging interface 113. AMR 100 can also include a main housing 115 within which various control elements and subsystems can be disposed, including those that enable the robotic vehicle to navigate from place to place.

Forks 110 extend from the AMR in a first direction. The AMR is configured to travel in the first direction and, alternatively, in a second direction. The second direction can be considered opposite to the first direction, understanding that the AMRs have turning capability in both directions.

The AMR 100 may include a plurality of sensors 150 that provide various forms of sensor data that enable the robotic vehicle to safely navigate throughout an environment, engage with objects to be transported, and avoid obstructions. In various embodiments, the sensor data from one or more of the sensors 150 can be used for path adaptation, including avoidance of detected objects, obstructions, hazards, humans, other robotic vehicles, and/or congestion during navigation. The sensors 150 can include one or more cameras, stereo cameras 152, radars, and/or laser imaging, detection, and ranging (LiDAR) scanners 154. One or more of the sensors 150 can form part of a 2D or 3D high-resolution imaging system.

In various embodiments, a user interface can be provided to input route planning information or other task planning information, such as job definition using job templates, or trigger inputs. A user interface (UI) 111 can be provided on the AMR or on a computer that communicates with the AMR, such as a laptop, tablet, phablet, desktop, mobile phone, or other such computer device having a user interface. A "wizard" may be generated at or within the UI to assist a user in inputting information necessary for task and/or route planning, e.g., the wizard user interface can present computer displays that guide a user through entering task and route information, and building jobs from job templates.

AMR 100 can be configured with the sensing, processing, and memory devices and subsystems necessary and/or useful for executing job templates to perform tasks, in accordance with aspects of the inventive concepts. AMR 100 takes the form of an AMR pallet lift, but the inventive concepts could be embodied in any of a variety of other types of robotic vehicles and AMRs, including, but not limited to, pallet trucks, tuggers, and the like. In other embodiments, the inventive concepts could be applied in other context with robotic vehicle that perform other tasks.

Figure 2:
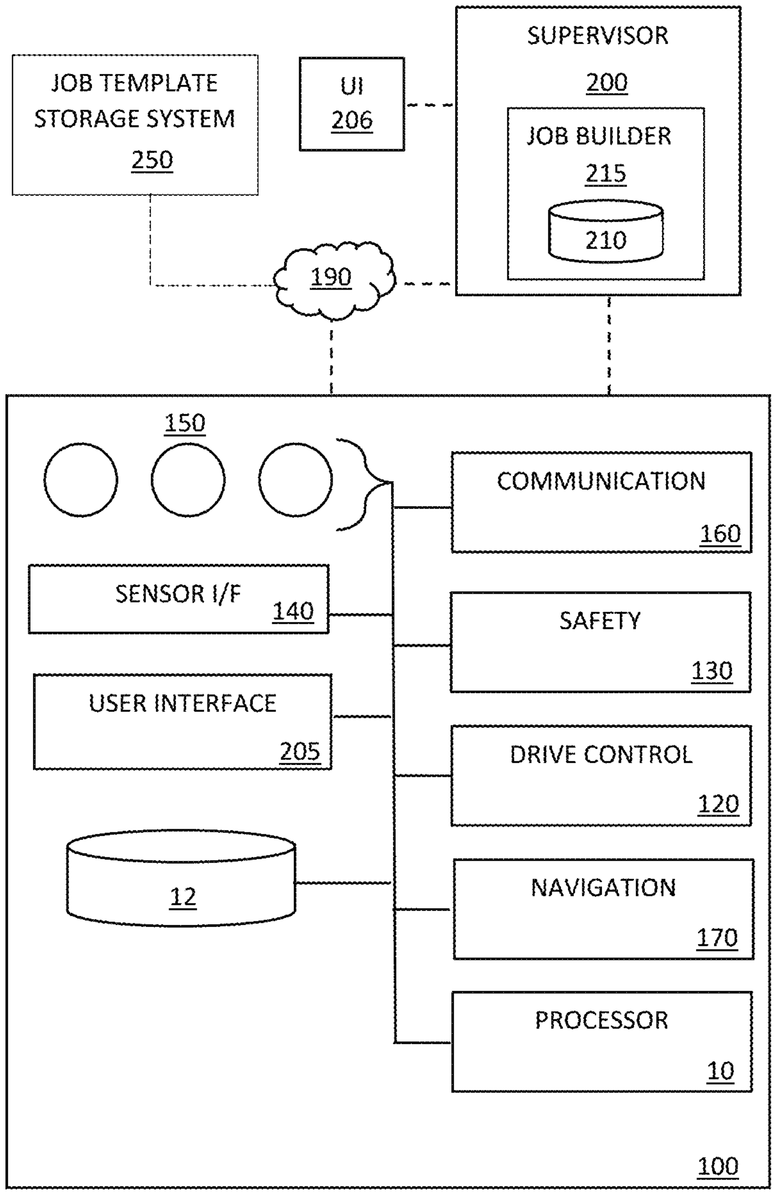
FIG. 2 is a block diagram of the AMR of FIG. 1, in accordance with aspects of inventive concepts.

FIG. 2 is a block diagram of components of an embodiment of AMR 100 of FIG. 1, in accordance with principles of inventive concepts. The embodiment of FIG. 2 is an example; other embodiments of a robotic vehicle can include other components and/or terminology. In the example embodiment shown in FIGS. 1 and 2, AMR 100 is a warehouse robotic vehicle, which can interface and exchange information with one or more external systems, including a supervisor system, fleet management system, and/or warehouse management system (collectively "Supervisor 200"). In various embodiments, supervisor 200 could be configured to perform, for example, fleet management and monitoring for a plurality of vehicles (e.g., AMRs) and, optionally, other assets within the environment. Supervisor 200 can be local or remote to the environment, or some combination thereof. In various embodiments, the supervisor 200 can be configured to provide instructions and data to AMR 100, and to monitor the navigation and activity of the robotic vehicle and, optionally, other robotic vehicles.

As is shown in FIG. 2, in example embodiments, AMR 100 includes various functional elements, e.g., components and/or modules, which can be housed within housing 115. Such functional elements can include at least one processor 10 coupled to at least one memory 12 to cooperatively operate the vehicle and execute its functions or tasks. Memory 12 can include computer program instructions, e.g., in the form of a computer program product, executable by processor 10. Memory 12 can also store various types of data and information. Such data and information can include route data, path data, path segment data, pick data, location data, environmental data, and/or sensor data, as examples, as well as the electronic map of the environment.

In this embodiment, processor 10 and memory 12 are shown onboard AMR 100 of FIG. 1, but external (offboard) processors, memory, and/or computer program code could additionally or alternatively be provided. That is, in various embodiments, the processing and computer storage capabilities can be onboard, offboard, or some combination thereof. For example, some processor and/or memory functions could be distributed across supervisor 200, other vehicles, and/or other systems external to the robotic vehicle 100.

The functional elements of AMR 100 can further include a navigation module 170 configured to access environmental data, such as the electronic map, and path information stored in memory 12, as examples. Navigation module 170 can communicate instructions to a drive control subsystem 120 to cause the robotic vehicle 100 to navigate its path within the environment. During vehicle travel, navigation module 170 may receive information from one or more sensors 150, via a sensor interface (I/F) 140, to control and adjust the navigation of the robotic vehicle. For example, sensors 150 may provide sensor data to navigation module 170 and/or drive control subsystem 120 in response to sensed objects and/or conditions in the environment to control and/or alter the robotic vehicle's navigation. As examples, sensors 150 can be configured to collect sensor data related to objects, obstructions, equipment, goods to be picked, hazards, completion of a task, and/or presence of humans and/or other robotic vehicles.

A safety module 130 can also make use of sensor data from one or more of sensors 150, including LiDAR scanners 154, to interrupt and/or take over control of drive control subsystem 120 in accordance with applicable safety standard and practices, such as those recommended or dictated by the United States Occupational Safety and Health Administration (OSHA) for certain safety ratings. For example, if safety sensors detect objects in the path as a safety hazard, such sensor data can be used to cause the drive control subsystem 120 to stop the vehicle to avoid the hazard.

Sensors 150 can include one or more stereo cameras 152 and/or other volumetric sensors, sonar sensors, and/or LiDAR scanners or sensors 154, as examples. Inventive concepts are not limited to particular types of sensors. In various embodiments, sensor data from one or more of sensors 150, e.g., one or more stereo cameras 152 and/or LiDAR scanners 154, can be used to generate and/or update a 2-dimensional or 3-dimensional model or map of the environment, and sensor data from one or more of the sensors 150 can be used for the determining location of AMR 100 within the environment relative to the electronic map of the environment.

The robotic vehicle may also include a human user interface module 205, which can process inputs and output of graphical user interface (GUI) 111 of the AMR. UI module 205 can be configured to process human operator inputs provided via UI 111, e.g., operator entry or indication of a pick or drop complete operation at a location on the AMR's path. Other human inputs could also be accommodated, such as inputting map, path, and/or configuration information.

In various embodiments, the UI 111 and UI module 205 cooperate in generation of jobs to be executed by AMR 100. That is, the UI module 205 can generate screens at the UI 111 that enable a user to selectively import job templates and customize the job templates to create a job to be executed by AMR 100. For example, the screens at UI 111 can include prompts and mechanisms that enable the user to start with a job template and then add specifics, such as identifying locations for performance of behaviors embodied in the job template, to create a job, such as a workflow job.

The AMR can include a communication module 160 configured to enable communications with supervisor 200 and/or any other external systems, such as other AMRs and/or human handheld or wearable devices used in the performance of job tasks. Communication module 160 can include hardware, software, firmware, receivers, and transmitters that enable communication with supervisor 200 and any other external systems over any now known or hereafter developed communication technology, such as various types of wireless technology including, but not limited to, Wi-Fi, Bluetooth, cellular, global positioning system (GPS), radio frequency (RF), and so on.

As an example, supervisor 200 could wirelessly communicate a path for AMR 100 to navigate for the vehicle to perform a task or series of tasks as part of a job. The path can be relative to a map of the environment stored in memory and, optionally, updated from time-to-time, e.g., in real-time, from vehicle sensor data collected in real-time as AMR 100 navigates and/or performs its tasks. The sensor data can include sensor data from sensors 150. As an example, in a warehouse setting the path could include a plurality of stops along a route for the picking and loading and/or the unloading of goods. The path can include a plurality of path segments. The navigation from one stop to another can comprise one or more path segments. Supervisor 200 can also monitor AMR 100, such as to determine robotic vehicle's location within an environment, battery status and/or fuel level, and/or other operating, vehicle, performance, and/or load parameters.

In various embodiments, a job builder system 215 (or job builder 215) can be provided and configured to create or generate, modify or update, delete, and save or store job templates electronically in a job builder storage 210. The job builder system can include job builder program job executable by at least one processor to generate and save job templates. Job builder 215 can also be used to later modify or delete job templates. Job builder 215 can also be used to export job templates to other systems or AMRs and/or import job templates from other systems or AMRs. Job builder 215 can embody the functionality to manage all aspects of job template generation, storage, import, export, modification, and deletion.

A job template can include one or more sequenced behaviors with one or more defined triggers that queue an associated behavior. For example, if a behavior is to identify a drop surface for dropping a pallet, a trigger could be the AMR locating itself at the infrastructure location on its route where the drop surface is expected to be located. As another example, a behavior could be to navigate to a next stop once a load is picked and the trigger could be operator input via UI 111. There are numerous types of behaviors, sequences of behaviors, and triggers that can be defined, depending on the workflow.

Job builder 215 may form part of supervisor 200 in some embodiments or may be a standalone system or can be part of another system serving the environment in which the AMRs operate in other embodiments. In some embodiments, job builder 215 may be configured to export job templates to an external or remote system, such as a job template storage system 250. Additionally, or alternatively, in some embodiments, job builder 215 may be configured to import job templates from job template storage system 250. In some embodiments, AMR 100 may be configured to export job templates to an external or remote system, such as a job template storage system 250. Additionally, or alternatively, in some embodiments, AMR 100 may be configured to import job templates from job template storage system 250. In various embodiments, AMR 100 and/or job builder 215 may be configured to communicate with job template storage system 250 via a network 190, which can be or include the Internet, World Wide Web, or other remote access system.

Job templates can be exported into (or uploaded into) and imported out of (or downloaded from) job template storage system 210. In some embodiments, job templates can be stored in a library of job templates locally in job builder storage 210 and/or in job template storage system 250 so that the job templates can be individually downloadable and/or accessible. The library may organize the job templates in different manners. For example, in some embodiments, the job templates may be organized by customer, facility, robotic vehicle type, and/or by job type. As an example, a drop task delivering goods may be one type of job and a pick task acquiring goods may be another type of job, as examples. A workflow can be built by combining a plurality of tasks, each task defined in the workflow using a job template for task definition within the context of the workflow and/or a plurality of tasks can be combined in a single job template. The tasks in a job template may be defined by behaviors with triggers, and the job template can define the sequence of behaviors and triggers.

While the job builder 215 is shown as part of supervisor 200 in FIG. 2, job builder 215 and/or job builder storage 210 can form part of a different system in some embodiments. In such embodiments, job builder 215 and/or job builder storage 210 can be independent of supervisor 200.

In some embodiments, once job templates have been created, job builder 215 can be installed in a new facility with a library of job templates for use in creating new jobs, which are stored in job builder storage. In some embodiments, job builder 215 can be installed as part of a new supervisor installation. Users can use these templates as a starting point for creating jobs that can later be requested. The library can be maintained by adding, deleting, and/or modifying job templates over time. For example, each time a new job is defined for an AMR, a new job template can be generated from the new job and saved in job template storage system 210.

In some embodiments, a job template library in a job builder system serving a facility can be updated from external sources, such as job template storage system 250. In some embodiments, job template storage system 250 can be updated by one or more job builder systems serving one or more facilities. Depending on the embodiment, the updates can be "pushed" or "pulled" from the external sources by the job builder system, supervisor, and/or job template storage system 250.

In various embodiments, job builder 215 is accessible via a user interface device to enable a user to generate, save, modify and delete job templates. As examples, the user interface could be a UI 206 that forms part of, or otherwise able to access, job builder 215 and/or supervisor 200. UI 206 can be or include a computer display, laptop, tablet, kiosk, or mobile device, as examples. The user interface could also be UI 111 of the AMR. These user interfaces, or other types of user interfaces, could be use to create new job templates for later use by users creating jobs. In some embodiments, job builder 215 can be used to process a job created for an AMR and extract a job template from the job, by maintaining definitions of the structure of behaviors and triggers, while omitting the job-specific details, such as identified AMR or AMRs locations and so on associated with a specific job.

Job builder 215 is also accessible via a user interface device to create jobs from job templates, by saving an instance of the template and adding job-specific details regarding locations of behaviors, triggers, and AMR or AMRs that will execute the workflow defined in the newly created job. Users can select a job template as a starting point for that job from stored job templates, which will create a partially filled out job and the user must fill in the details, such as the specific location/location group at each step. The job may be created from the job template via a user interface, such as UI 206 and/or UI 111 (and UI 205).

Templates created by a user can be exported from one facility to another via file transfer or, in a cloud system, automatically and be available for a given user. For example, consider a user that has several facilities, each with its own copy and installation of supervisor 200 and these facilities have a common complex job pattern. This pattern can be created as a template, exported, and transferred to the other copies of the supervisor 200 at the other facilities.

Figure 3:
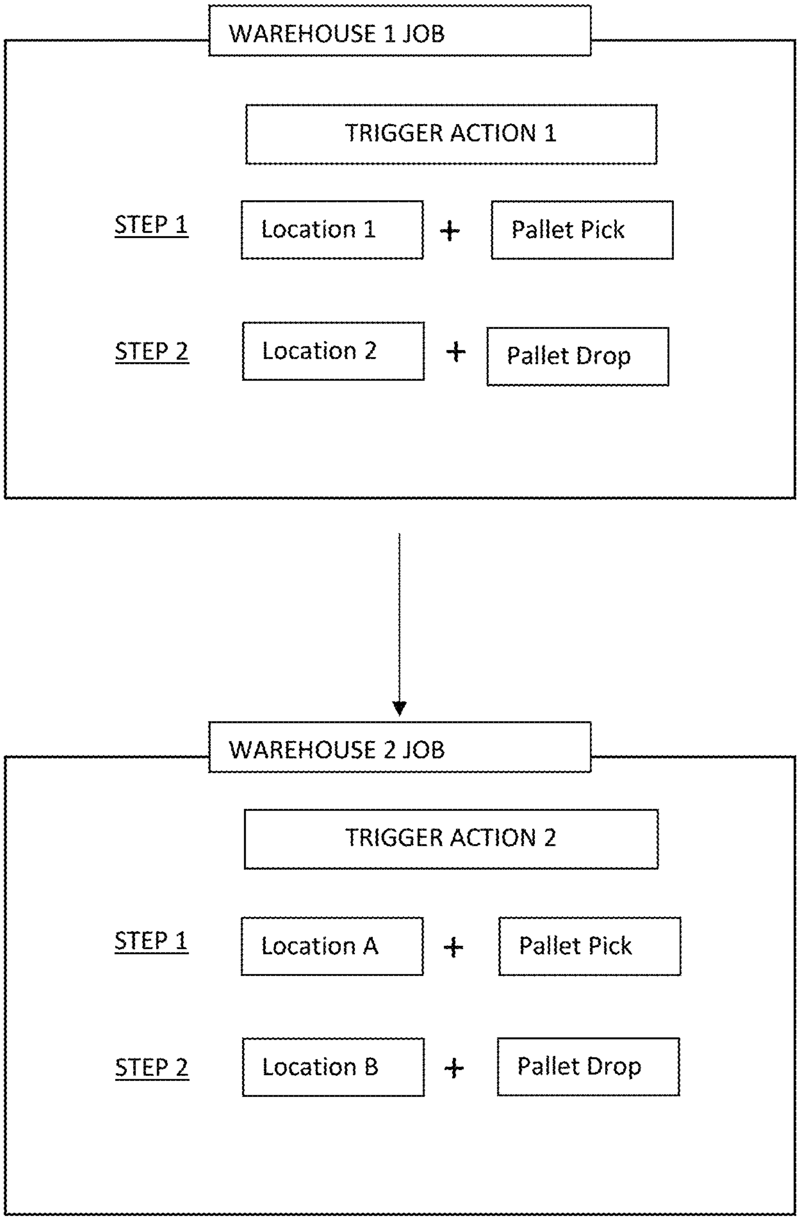
FIG. 3 illustrates an example of a job template being exported from one system and imported into another system, in accordance with aspects of the inventive concepts.
Figure 4:
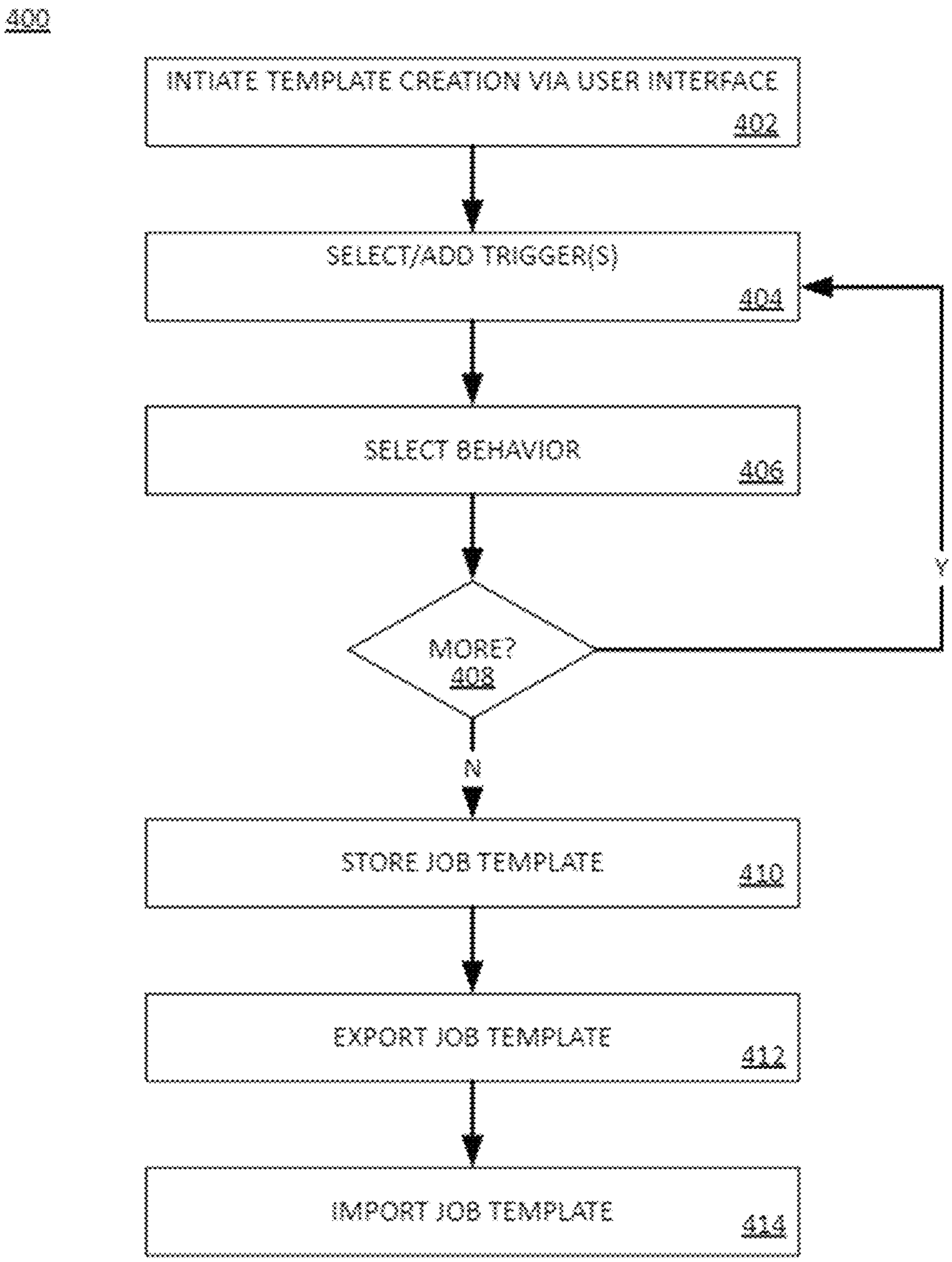
FIG. 4 illustrates a method of transferring a job template from one system to another system, in accordance with aspects of the inventive concepts.

FIG. 3 illustrates an example of a job template being exported from one system, for example, WAREHOUSE 1 and imported into another system, for example, WAREHOUSE 2, in accordance with aspects of the inventive concepts. FIG. 4 illustrates a method 400 of creating and transferring a job template from one system to another system, in accordance with aspects of the inventive concepts. In various embodiments, the system can be a warehouse management system or fleet management system that monitors and manages a plurality of AMRs autonomously navigating routes within the warehouse to gather goods from pick faces, pick locations, and/or pick zones, as examples.

As illustrated in FIGS. 3 and 4, a series of steps are templated at a first system, WAREHOUSE 1, by keeping the structure of the steps while ignoring the location specific information of the steps, in steps 402 through 410. For example, a workflow job template is defined for a first warehouse, called WAREHOUSE 1 job. This job template includes one trigger, TRIGGER ACTION 1, and two behaviors, STEP 1 and STEP 2. A location is associated with each behavior. The job template for the WAREHOUSE 1 job includes, at Location 1, perform a pallet pick behavior, in STEP 1, and at Location 2, perform a pallet drop, in STEP 2. Using this template, when trigger action 1 occurs, e.g., through user input, the AMR navigates to Location 1 and performs the Pallet Pick of STEP 1. Once STEP 1 is completed, STEP 2 is initiated, wherein the AMR navigates to Location 2 and performs the Pallet Drop. As a template, specific locations are not defined, nor is a particular AMR to execute the job. Ther trigger action can also be defined when customizing the template for a specific job.

Therefore, more generally, referring to method 400 of FIG. 4, to create a job template a user initiates template creation by launching job builder 215 via a user interface, e.g., UI 206 or UI 111, in step 402. In step 404, the user selects or adds a trigger that will be required to launch the behavior. In step 406, the user defines a behavior to be triggered. Some job templates include a plurality of behaviors associated with the same trigger. The behaviors occur in the sequence defined by the job template. In step 408, the user is prompted to add a next behavior at the user's option. If a next behavior is intended, the method transitions back to step 406, where the next behavior is selected. If, in step 408, no further behaviors are intended for the job template, the method transitions to step 410, where the user can save and store the job template. The job template can be stored in job builder storage 210 or some other electronic storage device.

Once the job template is saved and stored, method 400 can, optionally, continued to step 412 where the job template is exported to another system and/or database. Referring to FIG. 3, the templated set of steps is exported from the first system WAREHOUSE 1. In some embodiments, the templated set of steps from the first system WAREHOUSE 1 are stored in the job template storage system 250. The job template includes the framework of the trigger and the steps (i.e., the behaviors of pallet pick and pallet drop), but does not include the specific location information, namely, definitions for Location 1 and Location 2. In various embodiments, job template storage system 250 can be at one or more of WAREHOUSE 1, WAREHOUSE 2, or external to WAREHOUSE 1 and/or WAREHOUSE 2. Supervisor 200 can be located at WAREHOUSE 1 or WAREHOUSE 2, or each warehouse could have its one supervisor 200.

In optional step 414, the exported job template can be imported to a second system. Referring to FIG. 3, the job template can be imported to WAREHOUSE 2. In some embodiments, the job template is imported directly from the first system WAREHOUSE 1. In some embodiments, the templated set of steps are stored in job template storage system 250 and the job template is imported to the second system WAREHOUSE 2 from the job template storage system 250. At the second system, the site-specific details may be added to the template to form a new job at WAREHOUSE 2. That is, the locations within WAREHOUSE 2, namely, Location A and Location B, are defined for the template to go with the trigger and the steps of the pallet pick and the pallet drop, respectively, of the job template to generate a new job from the job template for execution by an AMR.

Figure 5:
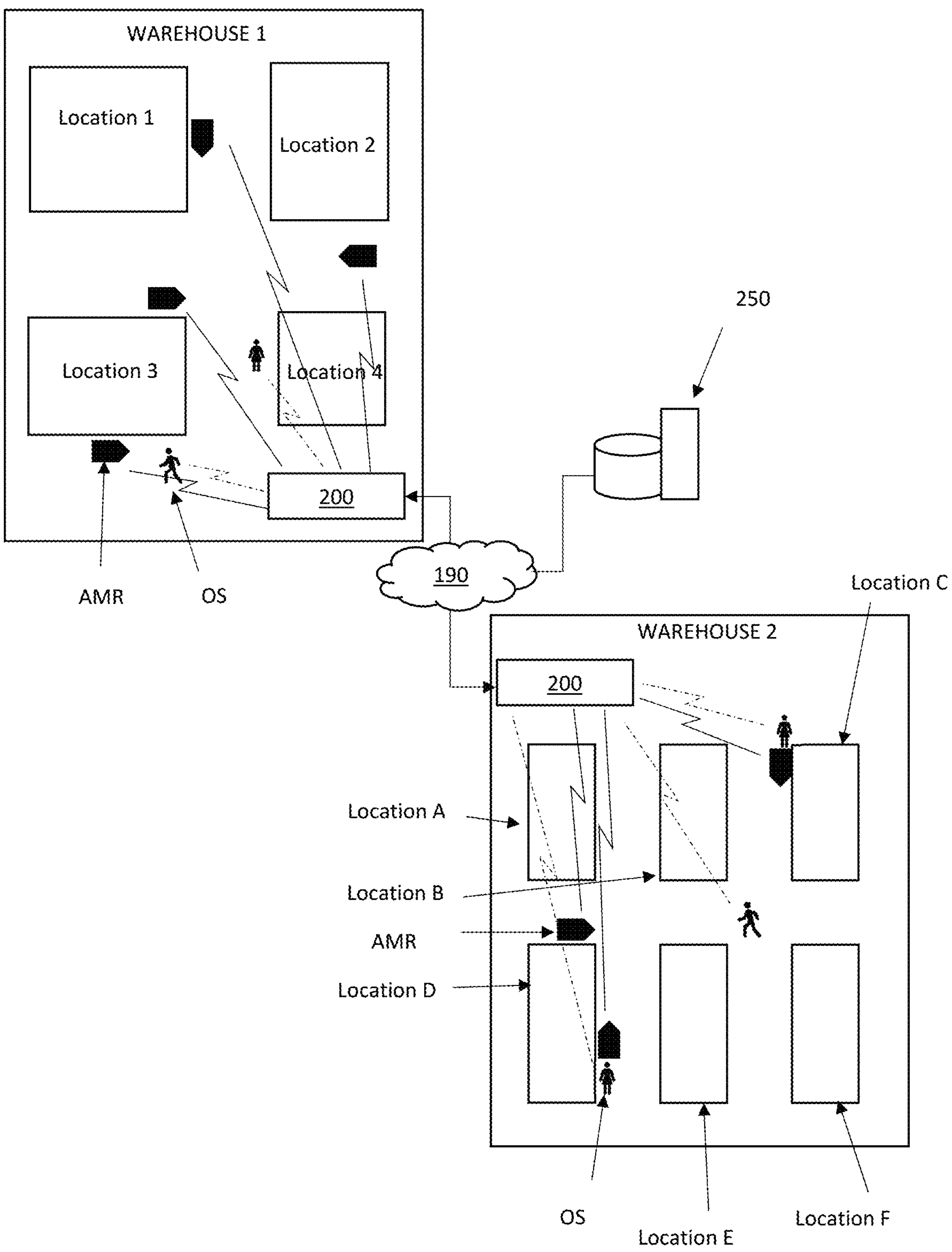
FIG. 5 is an embodiment of a plurality of warehouses with a plurality of AMRs and a plurality of order selectors engaged in order picking, in accordance with aspects of the inventive concepts.

FIG. 5 is an embodiment of a plurality of warehouses with a plurality of AMRs and a plurality of order selectors OS, e.g., humans with electronic order selector devices, engaged in order picking. The AMRs and order selectors in each warehouse can be monitored and managed by respective supervisors 200. The supervisors can share, exchange, and/or utilize job templates for defining common or similar work functions within their respective environments. The job templates can be stored at one or more of WAREHOUSE 1, WAREHOUSE 2, or job template storage system 250. The job templates could be exchanged, e.g., uploaded and/or downloaded, via a network 190. In various embodiments, the network could be a private network or virtual private network, the Internet, World Wide Web, or other network.

The template is used to create a job which includes the elements in the framework. A job can be requested by a user. A requested job that is assigned to an AMR is translated into instructions that the AMR understands and those instructions are sent to the AMR for execution.

Figure 6:
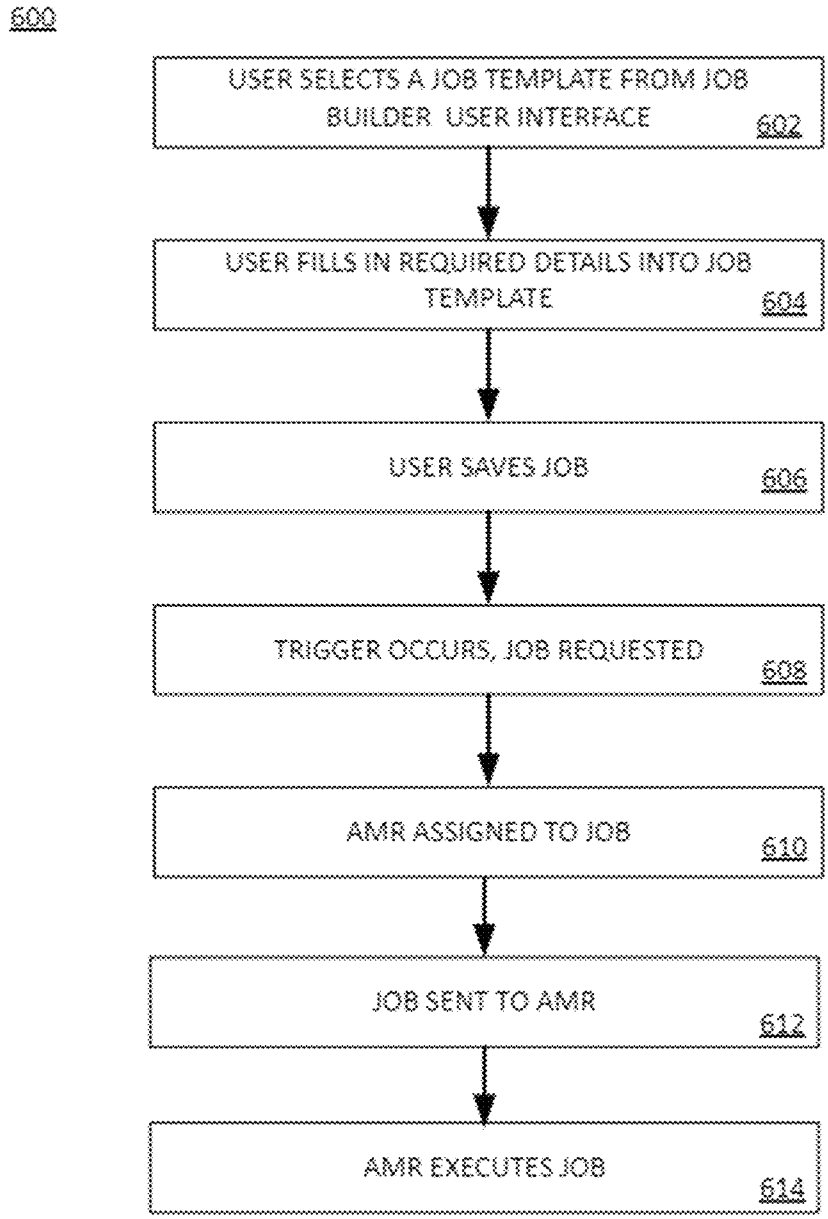
FIG. 6 illustrates a method of creating a job from a job template in a system, in accordance with aspects of the inventive concepts.

FIG. 6 illustrates a method 600 of using a job template to create or generate a new job and a method of assigning and executing the job, in accordance with aspects of the inventive concepts. In step 602, a user selects a job template from the job builder 215 via a user interface, e.g., UI 206 or UI 111. The job template will serve as the basis for a job to be performed. In step 604, using the job builder 215 UI, the user fills in required details from the job template, such as specific locations for each step and/or behavior. For example, specific location information for a facility can be added for each location in the job template, wherein each location is associated with a behavior defined in the job template. In step 606, the job is saved to computer storage, e.g., computer storage 210. In step 608, a job request is triggered in response to occurrence of the trigger configured in the job. For example, if the job uses an operator display trigger, the user (such as an order selector (OS) in FIG. 5) navigates to the floor operator interface UI and requests the job created in steps 602-606. In step 610, the job is assigned to an AMR, which can be an AMR determined by supervisor 200 to be available and/or proximate to a location indicated by the job. In step 612, the job is sent to the AMR, e.g., from supervisor 200. And in step 614, the AMR executes the job. Execution of the job includes the AMR performing the designated behaviors at the job-specific locations in response to the trigger or triggers indicated in the job and inherited from the job template.

Figure 7:
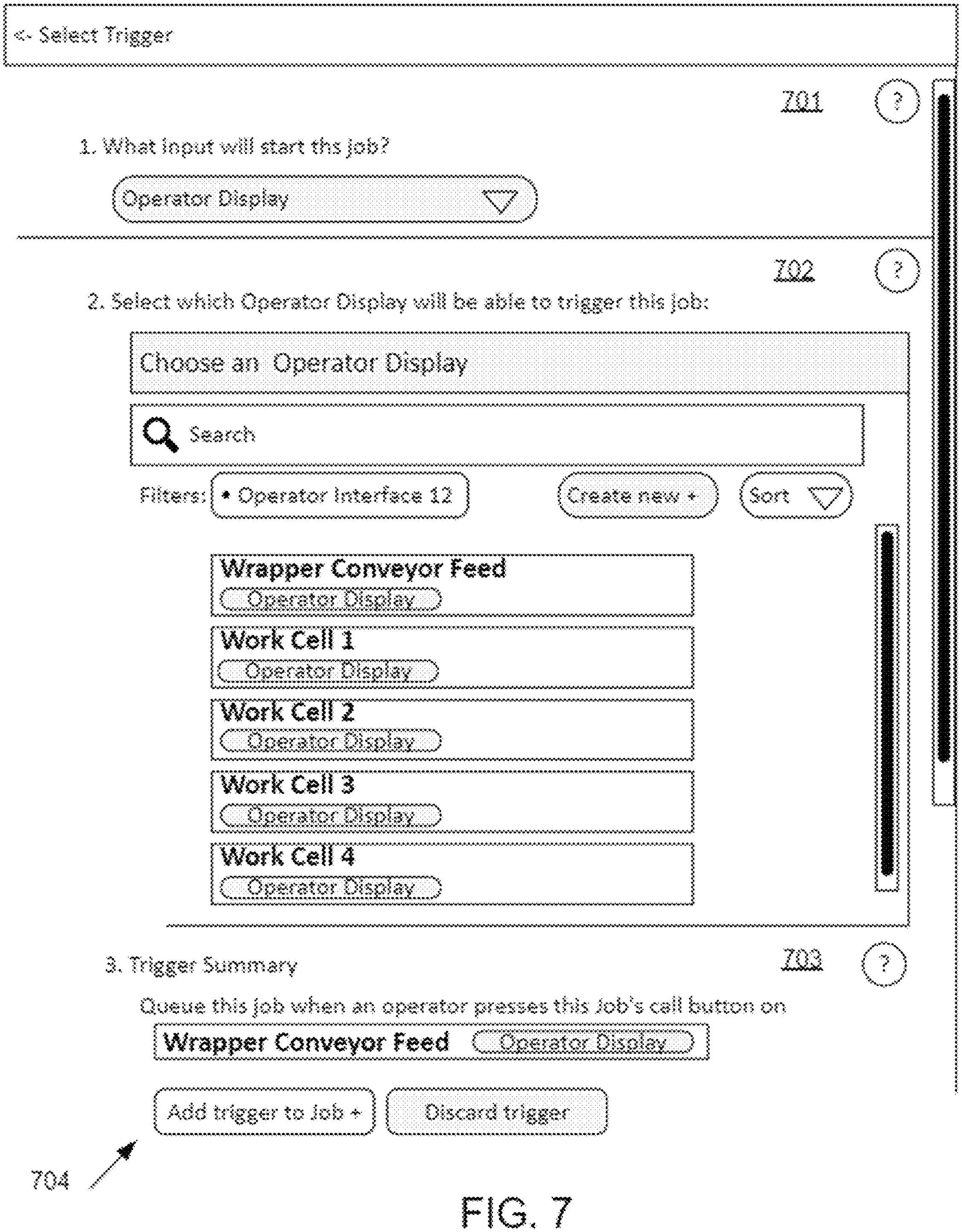
FIG. 7 is a view of an example embodiment of a user interface such as may be employed in configuring a job in accordance with principles of inventive concepts.

FIG. 7 illustrates an example embodiment of a graphical user interface (GUI) that can be presented by the job builder 215, in accordance with aspects of inventive concepts. In some embodiments, an operator, e.g., a human user, can operate a handheld device or other computer that presents the GUI. Alternatively, or additionally, in some embodiments, the GUI displays on a screen not associated with a handheld device.

In some embodiments, the user interface may be employed in a job configuration process as previously described and in such embodiments the user interface may present elements such as illustrated in FIG. 7. In example embodiments, an operator may create a new job from a stored job template by first naming the job. Then the operator configures a "trigger" section of the job. The trigger section defines how and when the job will start. As illustrated in segment 701 of the user interface, in an example embodiment the system queries the operator with the statement "what input will start this job?," and provides a pulldown menu that lists options for starting the job: that is, lists optional triggers. Trigger options include "operator display" (meaning that the trigger will be input through an operator display by an operator), PLC, or fleet management processor, for example. In the example of FIG. 7, an operator display is the trigger selected by an operator. The system then prompts the operator to select a specific instance of the trigger (e.g., operator display, PLC, or other) that will drive the trigger action, as illustrated in screen segment 702. The instances provided in this example embodiment include "wrapper conveyor feed," "work cell 1," "work cell 2," etc. and in this example an operator has selected "wrapper conveyor feed" as the trigger.

In accordance with principles of inventive concepts, a system and method may generate and present to an operator a plain language description of the tentative choice the operator has made. The plain language description may be generated by the system, for example, using a processor such as that of the job builder 215 and/or supervisor 200 to execute a variable lookup process, for example. In a job configuration process variables are generated in, for example, configuring a trigger or step and a system and method in accordance with principles of inventive concepts employs the variable selections by storing and linking the selections together to form a sentence when the configuration process or a portion thereof is completed. The variables can be options for fields defined within the job template being used to generate the job. Other methods of generating plain language text for presentation to an operator are contemplated within the scope of inventive concepts. In the example embodiment of FIG. 7 a plain language message, "Queue this job when an operator presses this job's call button on . . . wrapper conveyor feed operator display" is displayed as a "Trigger Summary" (GUI element 703) to echo back to the operator the configuration they have just (tentatively) set. The system provides, in GUI element 704, an operator the opportunity to add the trigger to the job or to discard the trigger from the job, the decision for which will be aided by the system's plain language echo of the operator's selections. However, if the job template in use requires a trigger for behaviors, then a trigger will need to be selected in accordance with the template.

As with the creation of triggers, the system provides plain language echoes of selections made during the configuration of job steps. As previously described, each step may include two elements that can be described as "Go Here" and "Do This." Once the operator has created and configured their desired steps or behaviors the operator may request a review of their tentative selections by requesting a summary. In example embodiments, a system and method in accordance with inventive concepts may provide a "Job Summary" tab on the GUI supported, for example, by job builder tool 215, which can be a tool of the supervisor 200 or other fleet management system. With the job summary provided by the system, the operator can read through their job steps in paragraph form to confirm the accuracy of the job configuration (e.g., "Step 1, the robot will travel to location 13 to pick a pallet, Step 2, etc.) In example embodiments, systems and methods in accordance with inventive concepts may be applied to various aspects including, but not limited to: Job descriptions, Trigger descriptions, Integration descriptions (that is, how an external system such as a PLC engages with AMRs), configuring data reporting on system performance, configuring power management logic and scheduling, and error reporting (where errors are stated in plain language, rather than as a cryptic message such as "error code BC0022," for example).

Figure 8A:
FIG. 8A-8D depict interactions with a user interface in the process of configuring a job in accordance with principles of inventive concepts.
Figure 8B:
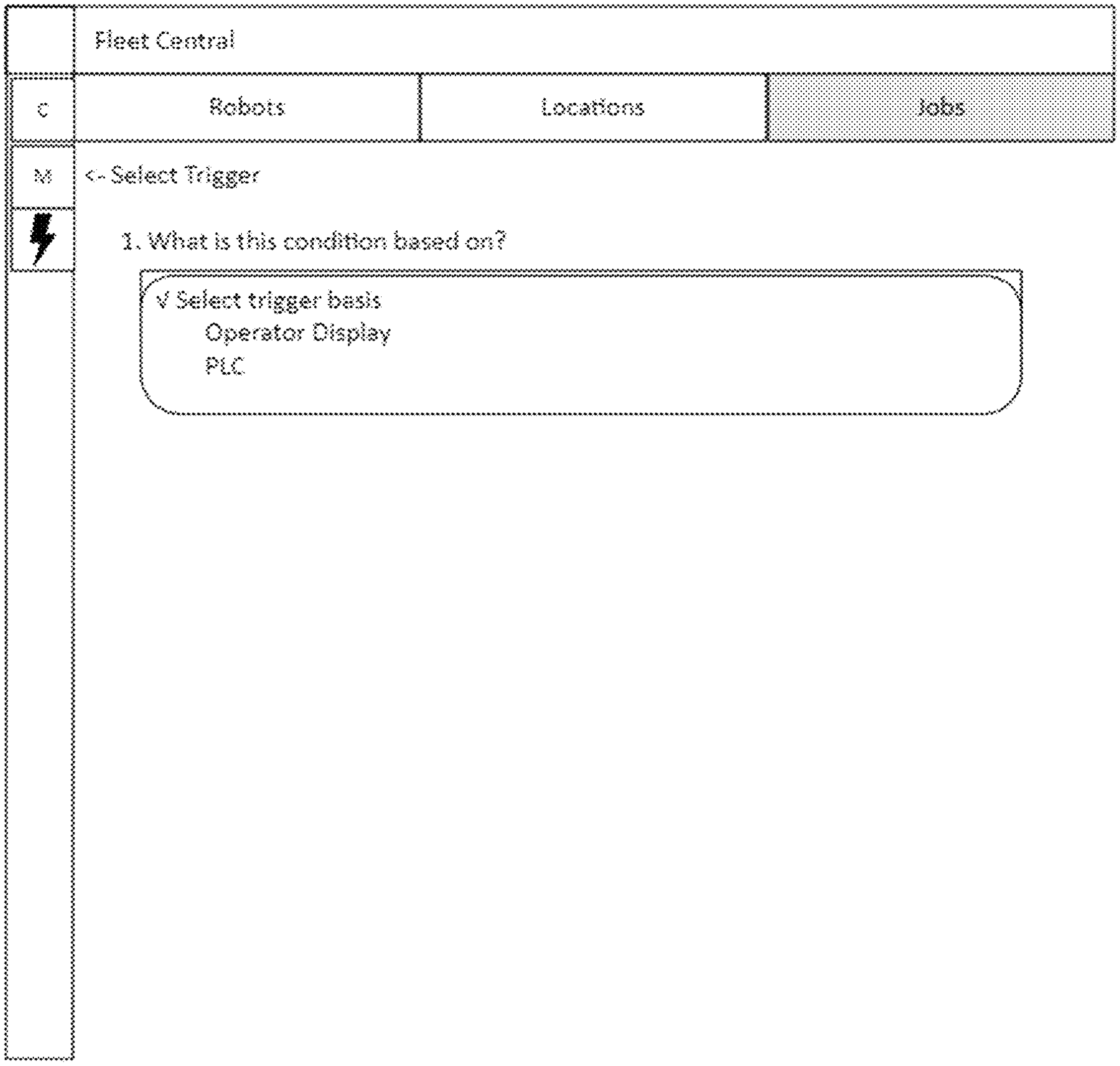
Figure 8C:
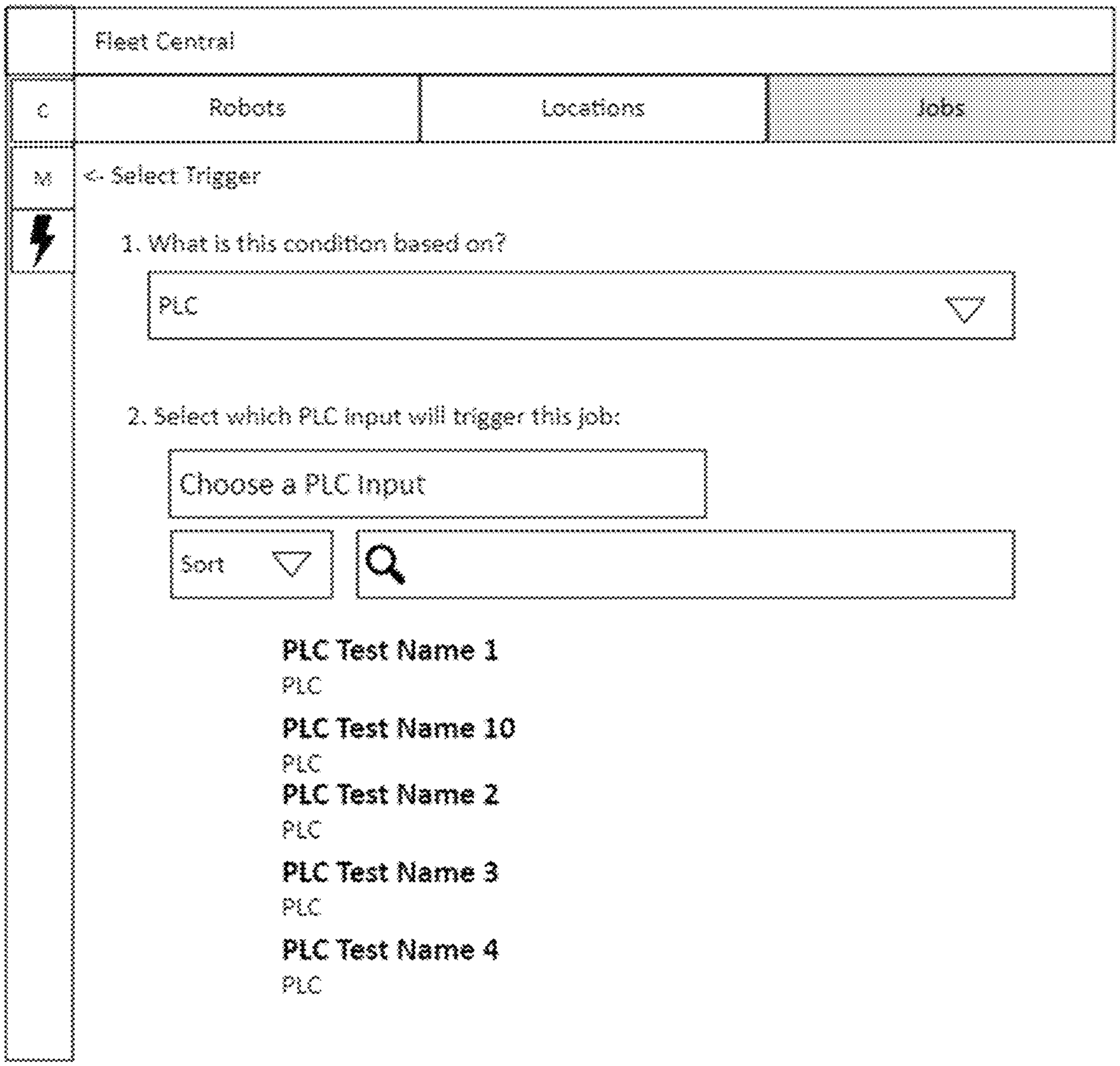
Figure 8D:
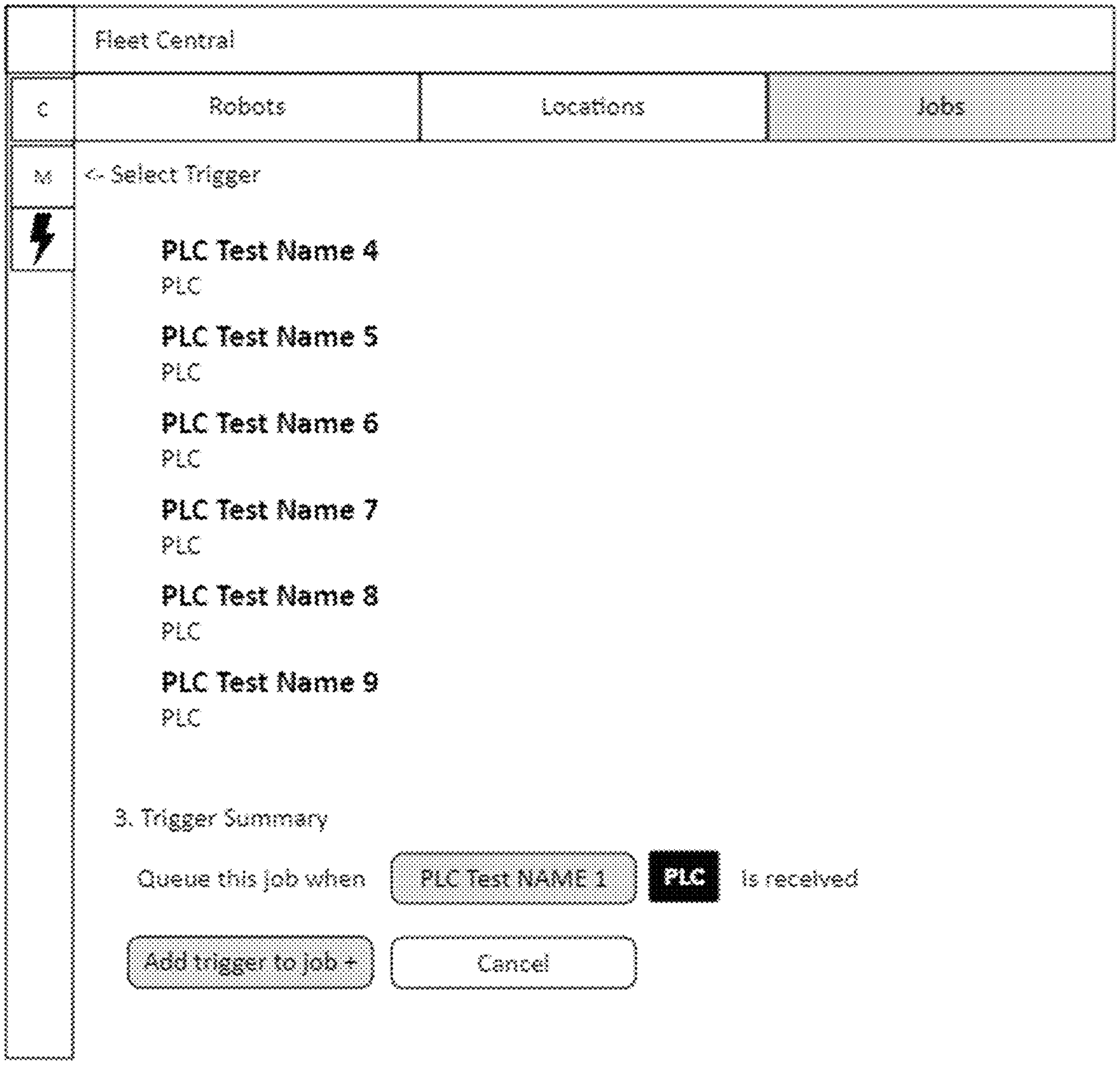

FIGS. 8A through 8D depict example user interface prompts such as may be produced during the configuration of a job, or job template, with the system, in FIG. 8A, prompting a user to select a trigger, with a pulldown menu provided to facilitate the choice and, in FIG. 8B, the choices provided are "Operator Display" or "PLC." Once the trigger basis has been selected the system prompts the user to select a PLC from a group of PLCs, including "PLC test name 1, etc. as illustrated in the user interface image of FIG. 8C. In FIG. 8D the trigger has been selected (PLC Test Name 1) and the selection is echoed to the user, "Queue this job when PLC Test NAME 1 PLC is received, and the user is given the option to add the selected trigger to the job or to cancel the selection.

Those skilled in the art will appreciate that the displays of FIG. 7 and FIGS. 8A-8D are examples; other displays could be provided to build job templates and/or build jobs from job templates. In various embodiments, a job template building computer program code is executable by at least one processor and configured to generate a set of user interactive computer screens on a display that enable a user to generate and store a reusable job template or build a job from a user-selected template. The job template building computer program code is executable to perform various processes, including rendering mechanisms that enable the user to: define a trigger, define one or more behaviors executable by an autonomous system in response to the trigger; for each behavior, define a location field with an unspecified location; and store the job template as a downloadable and customizable job template for use by one or more autonomous systems.

While the foregoing has described what are considered to be the best mode and/or other preferred embodiments, it is understood that various modifications can be made therein and that aspects of the inventive concepts herein may be implemented in various forms and embodiments, and that they may be applied in numerous applications, only some of which have been described herein. It is intended by the following claims to claim that which is literally described and all equivalents thereto, including all modifications and variations that fall within the scope of each claim.

It is appreciated that certain features of the inventive concepts, which are, for clarity, described in the context of separate embodiments, may also be provide in combination in a single embodiment. Conversely, various features of the inventive concepts which are, for brevity, described in the context of a single embodiment may also be provided separately or in any suitable sub-combination.

For example, it will be appreciated that all of the features set out in any of the claims (whether independent or dependent) can combined in any given way.

Below follows an itemized list of statements describing embodiments in accordance with the inventive concepts:

1. A job builder system, comprising:

at least one processor coupled to at least one computer storage device; and a template building computer program code executable by the at least one processor and configured to generate a set of user interactive computer screens on a display that enable a user to generate and store a reusable job template, including rendering mechanisms that enable the user to:

define a trigger;

define one or more behaviors executable by an autonomous system in response to the trigger;

for each behavior, define a location field with an unspecified location; and store the job template as a downloadable and customizable job template for use by one or more autonomous systems.

2. The system of statement 1, or any other statement or combination of statements, further comprising at least one database of behaviors that are user selectable.

3. The system of statement 1, or any other statement or combination of statements, wherein the one or more autonomous systems comprises a plurality of autonomous mobile robots (AMRs).

4. The system of statement 1, or any other statement or combination of statements, wherein the system is configured to export the job template to a job template storage system configured to store a plurality of job templates.

5. The system of statement 1, or any other statement or combination of statements, wherein the job builder system is further configured to import job templates from a job template storage system configured to store a plurality of job templates.

6 The system of statement 4 or 5, or any other statement or combination of statements, wherein the job template storage system is remote to the job builder system.

7. The system of statement 4 or 5, or any other statement or combination of statements, wherein the job template storage system is local to the job builder system.

8. The system of statement 1, or any other statement or combination of statements, further comprising a job template storage system configured to store the job template.

9. The system of statement 1, or any other statement or combination of statements, wherein the job template storage system is accessible by plurality of remote systems for export and/or import of job templates.

10. The system of statement 9, or any other statement or combination of statements, wherein the job template storage system is configured to enable a first system to upload a job template for use by a first set of autonomous systems in a first environment and a second system to download the job template for use by a second set of autonomous system in a second environment.

11. The system of statement 8, or any other statement or combination of statements, wherein the job template storage system is configured to store the job template in a job template library configured to store a plurality of job templates.

12. The system of statement 11, or any other statement or combination of statements, wherein the job template storage system is configured to organize or logically relate job templates in the job template library based on tasks type, customer, or facility.

13. The system of statement 1 or 3, or any other statement or combination of statements, further comprising job generation program code configured to generate a user interactive display that enables a user to select the job template and to define locations for each location field to generate a job for execution by the autonomous system.

14. The system of statement 13, or any other statement or combination of statements, wherein the job generation program code is further configured to assign the job to one or more autonomous systems.

15. The system of statement 14, or any other statement or combination of statements, wherein the one or more autonomous system comprises one or more autonomous mobile robots (AMRs).

16. The system of statement 1, or any other statement or combination of statements, wherein the template building program code is further executable to extract a job template from a job defined for performance of a task.

17. The system of statement 16, or any other statement or combination of statements, wherein the template building program code is further executable to extract a sequence of triggers and associated behaviors with unspecified locations to extract the job template.

18. The system of statement 17, or any other statement or combination of statements, wherein the template building program code is further configured to store the extracted job template as a new downloadable and customizable job template for use by one or more autonomous systems.

19. A job builder method, comprising:

providing at least one processor coupled to at least one computer storage device; and generating a set of user interactive computer screens on a display that enable a user to generate and store a reusable job template, including:

defining a trigger;

defining one or more behaviors executable by an autonomous system in response to the trigger;

for each behavior, defining a location field with an unspecified location; and storing the job template as a downloadable and customizable job template for use by one or more autonomous systems.

20 The method of statement 19, or any other statement or combination of statements, further comprising selecting the behaviors from at least one database of behaviors.

21. The method of statement 19, or any other statement or combination of statements, wherein the one or more autonomous systems comprises a plurality of autonomous mobile robots (AMRs).

22. The method of statement 19, or any other statement or combination of statements, further comprising exporting the job template to a job template storage system configured to store a plurality of job templates.

23. The method of statement 19, or any other statement or combination of statements, further comprising importing job templates from a job template storage system configured to store a plurality of job templates.

24. The method of statement 22 or 23, or any other statement or combination of statements, wherein the job template storage system is remote to the job builder system.

25. The method of statement 22 or 23, or any other statement or combination of statements, wherein the job template storage system is local to the job builder system.

26. The method of statement 19, or any other statement or combination of statements, further comprising storing the job template in a job template storage system.

27. The method of statement 26, or any other statement or combination of statements, wherein the job template storage system is accessible by plurality of remote systems for export and/or import of job templates.

28. The method of statement 27, or any other statement or combination of statements, further comprising:

a first system uploading a job template for use by a first set of autonomous systems in a first environment to the job template storage system; and a second system downloading the job template for use by a second set of autonomous system in a second environment.

29. The method of statement 26, or any other statement or combination of statements, further comprising the job template storage system storing the job template in a job template library configured to store a plurality of job templates.

30. The method of statement 29, or any other statement or combination of statements, further comprising the job template storage system organizing or logically relating job templates in the job template library based on tasks type, customer, or facility.

31. The method of statement 19 or 21, or any other statement or combination of statements, further comprising job generation program code generating a user interactive display enabling a user to select the job template and to define locations for each location field to generate a job for execution by the autonomous system.

32. The method of statement 31, or any other statement or combination of statements, further comprising the job generation program code assigning the job to one or more autonomous systems.

33. The method of statement 32, or any other statement or combination of statements, wherein the one or more autonomous system comprises one or more autonomous mobile robots (AMRs).

34. The method of statement 19, or any other statement or combination of statements, further comprising extracting a job template from a job defined for performance of a task.

35. The method of statement 34, or any other statement or combination of statements, wherein extracting the job template includes extracting a sequence of triggers and associated behaviors with unspecified locations.

36. The method of statement 35, or any other statement or combination of statements, further comprising storing the extracted job template as a new downloadable and customizable job template for use by one or more autonomous systems.

37. A job builder system, comprising:

a management system comprising at least one processor configured to generate a job template comprising a model of instructions for task performance when executed by at least one autonomous mobile robot (AMR) in a first system; and a transfer system comprising at least one processor configured to export the job template from the first system and import the job template to a second system.

38. The system of statement 37, or any other statement or combination of statements, further comprising at least one processor at the second system configured to provide site-specific details to the job template to create a job.

39. The system of statement 37, or any other statement or combination of statements, further comprising a management system at the second system configured to store the job template.

40. The system of statement 37, or any other statement or combination of statements, further comprising a storage system configured to store the job template.

41. The system of statement 37, or any other statement or combination of statements, further comprising a user interface in the first system and/or the second system configured to allow a user to select the job template and generate a job by adding details to the job template.

42. A job template building method, comprising:

generating a set of user displays providing prompts enabling a user to generate a job template comprising a model of instructions for task performance when executed by at least one AMR;

exporting the template from the first system; and importing job template to a second system.

43 The method of statement 42, or any other statement or combination of statements, further comprising storing the job template in a storage system.

44. The method of statement 42, or any other statement or combination of statements, selecting the job template using a user interface in the first system and/or the second system and generating a job by adding details to the selected job template and saving the job.

45. A system, comprising:

at least one processor coupled to at least one memory; and a computer program code executable by the at least one processor to:

generate a set of template builder displays soliciting user inputs defining a model of instructions for task performance;

store the model of instructions as a job template useable by any of a plurality of autonomous mobile robots (AMRs); and generate a set of job builder displays soliciting user inputs to create a job based on the job template, the job builder displays configured to enable a user to select the job template, add site-specific details to the selected job template, and save the job.

46. The system of statement 42, or any other statement or combination of statements, wherein the job template comprises at least one trigger having an associated one or more behaviors to the performed by an AMR at a location in response to occurrence of the at least one trigger.

47. The system of statement 46, or any other statement or combination of statements, wherein the job comprises the at least one trigger having the associated one or more behaviors to the performed by an AMR at locations indicated by the site-specific details in response to occurrence of the at least one trigger.

48. The system of statement 46, or any other statement or combination of statements, wherein the system is further configured to receive a message indicating occurrence of the trigger and in response assign the job to an AMR from the plurality of AMRs for execution.

49. The system of statement 48, or any other statement or combination of statements, wherein the system is configured to wirelessly communicate the job to the AMR.

50. The system of statement 48 or 49, or any other statement or combination of statements, wherein the system is further configured to monitor a plurality of AMRs and select the AMR from the plurality of AMR based on availability and/or location of the AMR.

51. The system of statement 45, or any other statement or combination of statements, further comprising a transfer system comprising at least one processor configured to export the job template from a first system comprising the plurality of AMRs to a second system for use by AMRs associated with the second system.

52. The system of statement 45 or 51, or any other statement or combination of statements, further comprising a storage system comprising a library configured to job templates.

53. The system of statement 52, or any other statement or combination of statements, wherein the library is configured to import job templates from external or remote systems and/or export job templates to external or remote systems.

54 The system of statement 52, or any other statement or combination of statements, wherein the library is configured to organize stored job templates based on job type, AMR type, customer, and/or facility.

55. A method, comprising:

providing at least one processor coupled to at least one memory;

generating a set of template builder displays soliciting user inputs defining a model of instructions for task performance;

storing the model of instructions as a job template useable by any of a plurality of autonomous mobile robot (AMRs);

generating a set of job builder displays soliciting user inputs to create a job based on the job template, the job builder displays configured to enable a user to select the job template, add site-specific details to the selected job template, and saving the job.

56. The method of statement 55, or any other statement or combination of statements, wherein the job template comprises at least one trigger having an associated one or more behaviors to the performed by an AMR at a location in response to occurrence of the at least one trigger.

57. The method of statement 56, or any other statement or combination of statements, wherein the job comprises the at least one trigger having the associated one or more behaviors to the performed by an AMR at locations indicated by the site-specific details in response to occurrence of the at least one trigger.

58 The method of statement 56, or any other statement or combination of statements, further comprising receiving a message indicating occurrence of the trigger and in response assigning the job to an AMR from the plurality of AMRs for execution.

59 The method of statement 58, or any other statement or combination of statements, further comprising wirelessly communicating the job to the AMR.

60. The method of statement 58 or 59, or any other statement or combination of statements, further comprising monitoring a plurality of AMRs and selecting the AMR from the plurality of AMR based on availability and/or location of the AMR.

61. The method of statement 55, or any other statement or combination of statements, further comprising exporting the job template from a first system comprising the plurality of AMRs to a transfer system and from the transfer system to a second system for use by AMRs associated with the second system.

62. The method of statement 55 or 61, or any other statement or combination of statements, further comprising storing the job template in a storage system comprising a library of job templates.

63. The system of statement 62, or any other statement or combination of statements, wherein the library is configured to import job templates from external or remote systems and/or export job templates to external or remote systems.

64. The system of statement 62, or any other statement or combination of statements, further comprising organizing stored job templates in the library based on job type, AMR type, customer, and/or facility.

What is claimed is:

1. A job builder system, comprising:
- a management system comprising:
  - at least one processor coupled to at least one computer storage device; and
  - a template building computer program code executable by the at least one processor and configured to generate a set of user interactive computer screens on a display that enable a user to define a trigger and one or more behaviors executable by an autonomous system in response to the trigger,
  - wherein the at least one processor is configured to:
    - generate, at a first system, a reusable job template comprising the defined trigger, the defined one or more behaviors executable by an autonomous system in response to the trigger, and for each behavior, a defined location field with an unspecified location, and
    - store the job template as a downloadable and customizable job template for use by one or more autonomous systems; and
- a transfer system comprising at least one processor configured to export the job template from the first system and import the job template to a second system,
- wherein the second system comprises at least one processor configured to define specific locations for each location field in the reusable job template at the second system and configured to generate a job for execution by one or more autonomous systems at the second system,
- wherein the one or more autonomous systems of the second system comprises a plurality of autonomous mobile robots (AMRs),
- wherein at least one processor of the second system is further configured to receive a message indicating occurrence of the defined trigger and, in response to the occurrence of the defined trigger, to initiate a job request and to assign the job to an AMR from the plurality of AMRs for execution, and
- wherein the at least one processor of the second system is further configured to translate the assigned job into instructions that the AMR understands and wirelessly communicate the instructions to the assigned AMR for execution.

2. The system of claim 1, further comprising at least one database of behaviors that are user selectable.

3. The system of claim 1, wherein the system is configured to export the job template to a job template storage system configured to store a plurality of job templates.

4. The system of claim 3, wherein the job template storage system is accessible by plurality of remote systems for export and/or import of job templates.

5. The system of claim 4, wherein the job template storage system is configured to enable a first system to upload a job template for use by a first set of autonomous systems in a first environment and a second system to download the job template for use by a second set of autonomous system in a second environment.

6. The system of claim 3, wherein the job template storage system is configured to store the job template in a job template library configured to store a plurality of job templates, wherein the job template storage system is configured to organize or logically relate job templates in the job template library based on tasks type, customer, or facility.

7. The system of claim 1, further comprising job generation program code configured to generate a user interactive display that enables a user to select the job template and to define locations for each location field to generate a job for execution by the autonomous system.

8. The system of claim 7, wherein the job generation program code is further configured to assign the job to one or more autonomous systems.

9. The system of claim 1, wherein:
- the template building program code is further executable to extract a job template from a job defined for performance of a task;
- the template building program code is further executable to extract a sequence of triggers and associated behaviors with unspecified locations to extract the job template; and
- the template building program code is further configured to store the extracted job template as a new downloadable and customizable job template for use by one or more autonomous systems.

10. A job builder method, comprising:
- providing at least one processor coupled to at least one computer storage device; and
- generating a set of user interactive computer screens on a display that enable a user to define a trigger and one or more behaviors executable by an autonomous system in response to the trigger;
- the at least one processor:
  - generating, at a first system, a reusable job template comprising the defined trigger, the defined one or more behaviors executable by an autonomous system in response to the trigger, and for each behavior, a defined location field with an unspecified location, and storing the job template as a downloadable and customizable job template for use by one or more autonomous systems, at least one processor of a transfer system exporting the job template from the first system and importing the job template to a second system, at least one processor of the second system defining specific locations for each location field in the reusable job template at the second system and generating a job for execution by one or more autonomous systems at the second system, wherein the one or more autonomous systems comprises a plurality of autonomous mobile robots (AMRs); and upon receipt, at the second system, of a message indicating occurrence of the defined trigger, at least one processor of the second system initiating a job request corresponding to the job, assigning the job to an AMR from the plurality of AMRs for execution, translating the assigned job into instructions that the AMR understands, and wirelessly communicating the instructions to the assigned AMR for execution.

11. The method of claim 10, further comprising selecting the behaviors from at least one database of behaviors.

12. The method of claim 10, further comprising exporting the job template to a job template storage system configured to store a plurality of job templates.

13. The method of claim 12, wherein the job template storage system is accessible by plurality of remote systems for export and/or import of job templates.

14. The method of claim 13, further comprising:

a first system uploading a job template for use by a first set of autonomous systems in a first environment to the job template storage system; and a second system downloading the job template for use by a second set of autonomous system in a second environment.

15. The method of claim 12, further comprising:

the job template storage system storing the job template in a job template library configured to store a plurality of job templates; and the job template storage system organizing or logically relating job templates in the job template library based on tasks type, customer, or facility.

16. The method of claim 10, further comprising job generation program code generating a user interactive display enabling a user to select the job template and to define locations for each location field to generate a job for execution by the autonomous system.

17. The method of claim 16, further comprising the job generation program code assigning the job to one or more autonomous systems.

18. The method of claim 10, further comprising:

extracting a job template from a job defined for performance of a task, wherein extracting the job template includes extracting a sequence of triggers and associated behaviors with unspecified locations; and storing the extracted job template as a new downloadable and customizable job template for use by one or more autonomous systems.

* * * * *